(12) United States Patent
Daniels

(10) Patent No.: US 9,918,570 B2
(45) Date of Patent: Mar. 20, 2018

(54) BIODEGRADABLE MANNEQUIN AND METHOD OF MAKING SAME

(71) Applicant: RNS Packaging Corporation, Dowagiac, MI (US)

(72) Inventor: Richard Daniels, Dowagiac, MI (US)

(73) Assignee: RNS PACKAGING CORPORATION, Dowagiac, MI (US)

(*) Notice: Subject to any disclaimer, the term of this patent is extended or adjusted under 35 U.S.C. 154(b) by 22 days.

(21) Appl. No.: 14/925,798

(22) Filed: Oct. 28, 2015

(65) Prior Publication Data

US 2016/0120339 A1    May 5, 2016

Related U.S. Application Data

(60) Provisional application No. 62/073,114, filed on Oct. 31, 2014.

(51) Int. Cl.
*A47F 8/02*      (2006.01)
*A47F 7/10*      (2006.01)
*C08L 3/02*      (2006.01)

(52) U.S. Cl.
CPC .............. *A47F 8/02* (2013.01); *A47F 7/10* (2013.01); *C08L 3/02* (2013.01)

(58) Field of Classification Search
CPC ...... A47F 8/00; A47F 8/02; A47F 7/10; C08L 3/02; A41H 5/00; A63H 3/00; A45D 44/14; G09F 19/08; G09F 2019/086
USPC .................................. D9/600, 614
See application file for complete search history.

(56) References Cited

U.S. PATENT DOCUMENTS

| | | | |
|---|---|---|---|
| 5,409,150 A * | 4/1995 | Tranquilli | A47F 8/02 223/66 |
| 6,136,255 A | 10/2000 | Ando et al. | |
| 7,173,080 B2 * | 2/2007 | Yamada | C08L 67/02 523/124 |
| D551,976 S | 10/2007 | Daniels | |
| D551,977 S | 10/2007 | Daniels | |
| D551,978 S | 10/2007 | Daniels | |
| D551,979 S | 10/2007 | Daniels | |
| 8,258,254 B2 | 9/2012 | Inoue et al. | |

(Continued)

FOREIGN PATENT DOCUMENTS

| | | | |
|---|---|---|---|
| GB | 2492792 A * | 1/2013 | |
| JP | 09121994 A * | 5/1997 | |

(Continued)

OTHER PUBLICATIONS http://www.starchtech.com/biodegradable-packing-peanuts.html (2 pages), "The Mighty I Biodegradable Packing Peanuts" (downloaded Aug. 4, 2014).

*Primary Examiner* — Ismael Izaguirre
(74) *Attorney, Agent, or Firm* — Howard & Howard Attorneys PLLC

(57) ABSTRACT

A biodegradable mannequin is made of a biodegradable material and a method of making the biodegradable mannequin includes the steps of providing a biodegradable material, extruding the biodegradable material, filling a mold cavity of a mold with the extruded biodegradable material, pressing the extruded biodegradable material into the mold cavity, closing the mold, curing the extruded biodegradable material in the mold to form the mannequin, opening the mold, and removing the formed mannequin from the mold.

10 Claims, 2 Drawing Sheets

(56) References Cited

U.S. PATENT DOCUMENTS

2003/0230014 A1* 12/2003 Murphy .................. G09F 19/08
                                                                          40/421
2013/0228974 A1* 9/2013 Davis, Jr. .................. F41J 5/24
                                                                          273/378

FOREIGN PATENT DOCUMENTS

| | | | | |
|---|---|---|---|---|
| JP | 090194601 | A | * | 7/1997 |
| JP | 2001252968 | A | * | 9/2001 |
| JP | 2002010887 | A | * | 1/2002 |

* cited by examiner

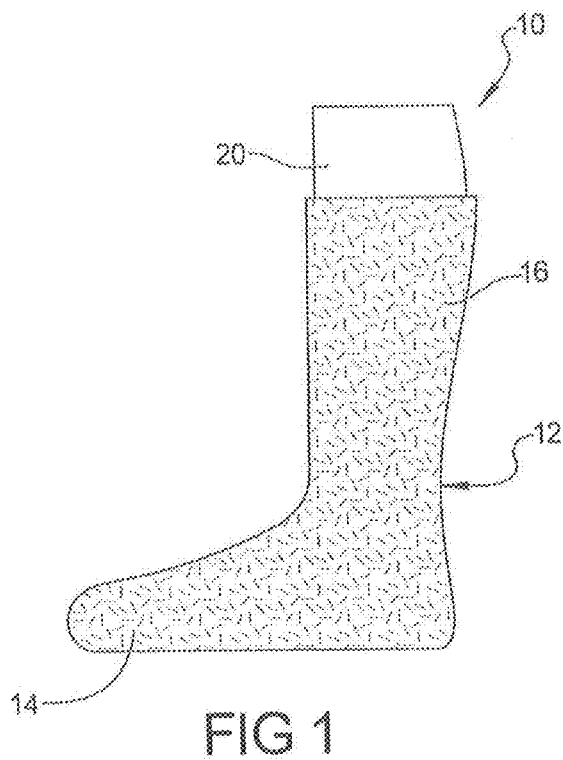
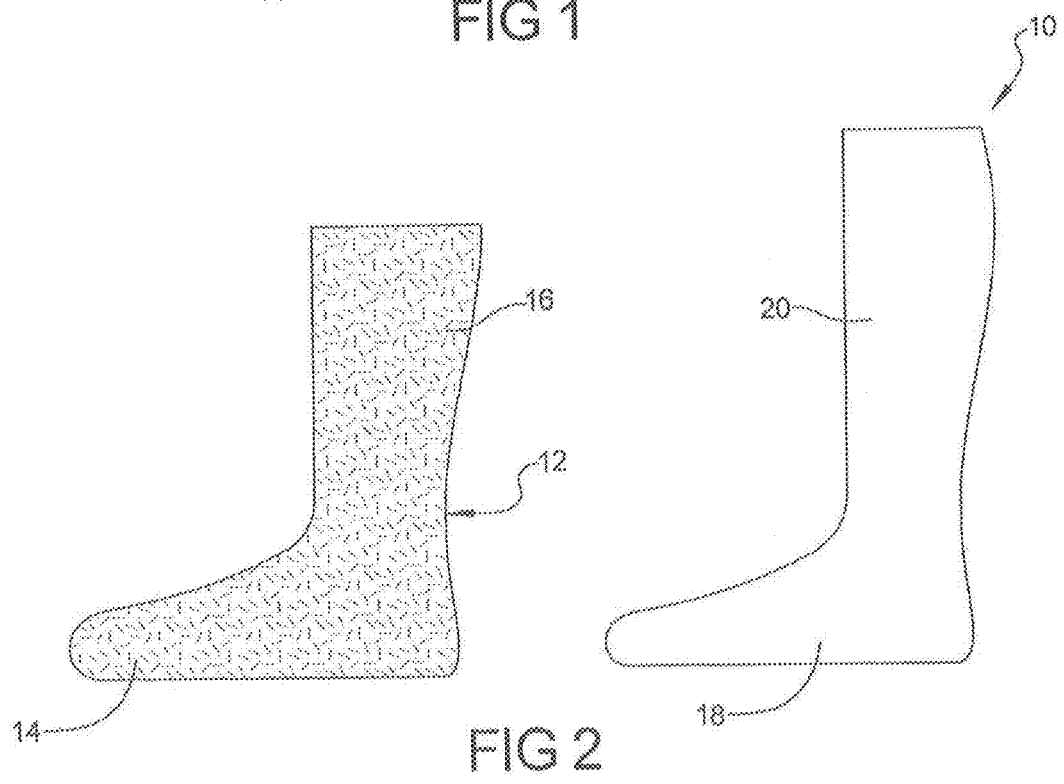

BIODEGRADABLE MANNEQUIN AND METHOD OF MAKING SAME

CROSS-REFERENCE TO RELATED APPLICATION(S)

The present application claims the benefit of Provisional Patent Application, Ser. No. 62/073,114, filed Oct. 31, 2014.

BACKGROUND OF THE INVENTION

1. Field of the Invention

The present invention relates generally to mannequins and, more particularly, to a biodegradable mannequin and method of making same.

2. Description of the Related Art

It is known to provide a mannequin for clothing. In at least one form, the mannequin may be a head for displaying a hat or a lower leg for displaying a sock. Typically, these mannequins are made of a plastic material. Because the mannequins are frequently replaced, the discarded mannequins are sent to a landfill and do not degrade for a very long time.

It is, therefore, desirable to provide a biodegradable mannequin. It is also desirable to provide a method of making a biodegradable mannequin. It is further desirable to provide a biodegradable mannequin that can be used to display clothing and the like. Thus, there is a need in the art to provide a biodegradable mannequin and method of making same.

SUMMARY OF THE INVENTION

Accordingly, the present invention provides a biodegradable mannequin. The biodegradable mannequin is made of a biodegradable material being formed to display an article of clothing. The present invention also provides a method of making the biodegradable mannequin including the steps of providing a biodegradable material and extruding the biodegradable material. The method also includes the steps of opening a mold, filling a mold cavity of the mold with the extruded biodegradable material, and pressing the extruded biodegradable material into the mold cavity. The method further includes the steps of closing the mold and curing the extruded biodegradable material in the mold to form the mannequin. The method also includes the steps of opening the mold and removing the formed mannequin from the mold.

One advantage of the present invention is that a biodegradable mannequin is provided for displaying clothing and the like. Another advantage of the present invention is that a method is provided for making a biodegradable mannequin. Yet another advantage of the present invention is that the biodegradable mannequin and method includes making the mannequin of a starch based material that is biodegradable. Still another advantage of the present invention is that the biodegradable mannequin and method uses the starch based material to mold a mannequin that can be used to display clothing.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is an elevational view of one embodiment of a biodegradable mannequin, according to the present invention, illustrating an article of clothing displayed thereon.

FIG. 2 is an exploded view of the biodegradable mannequin and article of clothing of FIG. 1.

DETAILED DESCRIPTION OF THE PREFERRED EMBODIMENT(S)

Figure 3:
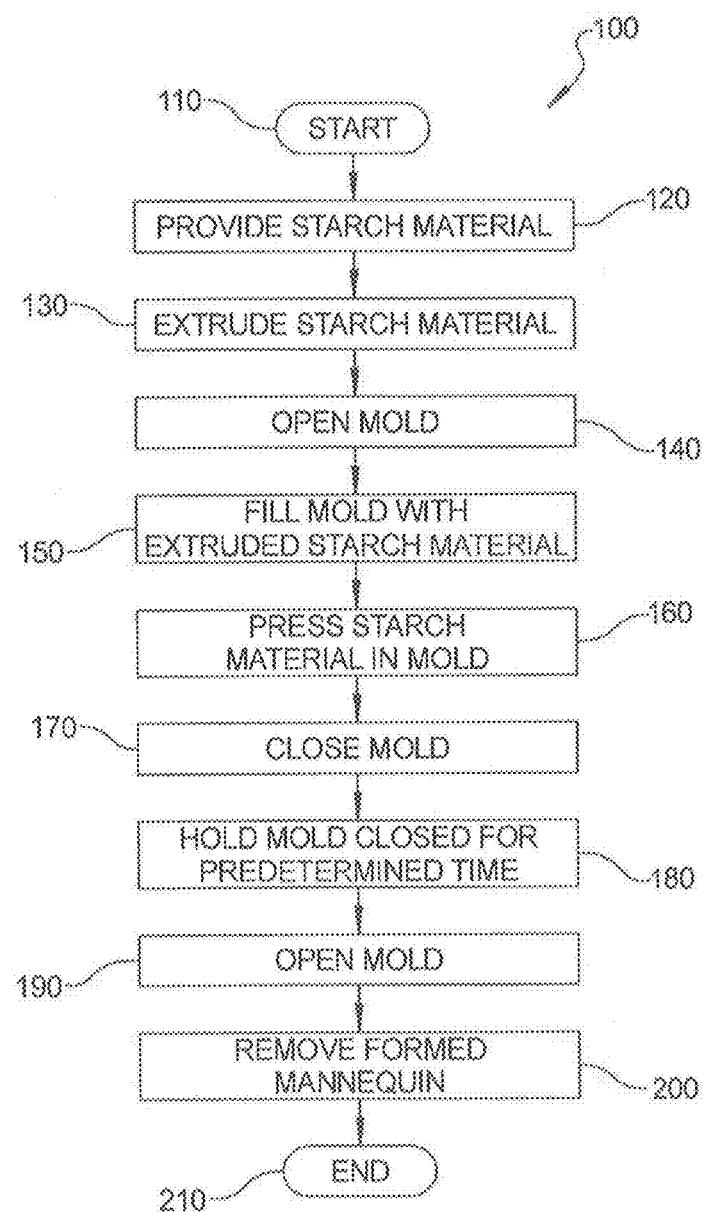
FIG. 3 is a flowchart of a method, according to one embodiment of the present invention, of making the biodegradable mannequin of FIGS. 1 and 2.

Referring to the figures, wherein like numerals indicate like parts throughout the several views, one embodiment of a biodegradable mannequin, according to the present invention, is shown generally at 10. The biodegradable mannequin 10 is configured to display an article of clothing, generally indicated at 12, mounted thereon. As illustrated in FIG. 1, the article of clothing 12 is generally "L" in shape to represent a sock. The article of clothing 12 has a foot portion 14 and a leg portion 16 extending from the foot portion 14. It should be appreciated that the article of clothing 12 illustrated in FIG. 1 is known in the art and is commercially available. It should also be appreciated that the article of clothing 12 illustrated in FIG. 1 is not intended to limit the scope of the present invention. It should further be appreciated that the biodegradable mannequin 10 may be used with various other types of articles, not specifically shown herein, without departing from the scope of the present invention.

Referring to FIGS. 1 and 2, one embodiment of the biodegradable mannequin 10 is illustrated generally "L" in shape to display the article of clothing 12. The biodegradable mannequin 10 has a foot portion 18 for engaging a support surface and a leg portion 20 extending from the foot portion 16. The foot portion 18 and leg portion 20 are integral, unitary, and one-piece. It should be appreciated that the biodegradable mannequin 10 illustrated in FIGS. 1 and 2 is not intended to limit the scope of the present invention and that the biodegradable mannequin 10 includes all human body forms (e.g., torso, head, hands, etc., combinations thereof, and complete body. It should also be appreciated that the biodegradable mannequin 10 may be used with various other types of articles, not specifically shown herein, without departing from the scope of the present invention.

The biodegradable mannequin 10 is made of a biodegradable material. In one embodiment, the foot portion 18 and leg portion 20 are made of a biodegradable material. In one embodiment, the biodegradable material is a starch based material. An example of suitable starch based material for the present invention includes Re-New 400, Starch Resin for Biodegradable Loosefill Packaging, commercially available from Starch-Tech, Inc., Minneapolis, Minn. The starch based material is a carbohydrate and at least one or more polymers with the starch from corn or potato. The starch based material is a solid resin pellet with a cereal odor. The starch based material will dissolve slowly in water. The starch based material will degrade in compost or extended exposure to water, for example, approximately twenty-one days in moist soil and approximately seven days in warm compost. It should be appreciated that the example starch based material is not intended to limit the scope of the present invention. It should also be appreciated that the biodegradable mannequin 10 may be used with various other types of starch based materials, not specifically described herein, without departing from the scope of the present invention.

In another embodiment, the biodegradable material may include pre-color pigments or dyes. Although not required, the biodegradable material may comprise a colorant component for modifying a pigment or dye of the biodegradable material. It should be appreciated that suitable pre-color pigments known in the art may be used.

Referring to FIG. 3, the present invention further provides a method, according to one embodiment of the present invention, of making the biodegradable mannequin 10. In one embodiment, the biodegradable mannequin 10 is made from an extruding and molding process. In general, a flowchart of the method, generally shown at 100, starts in bubble 110 and includes the steps of providing a mold (not shown) which defines a cavity and core for the biodegradable mannequin 10 and providing a biodegradable material such as a starch based material in block 120. In one embodiment, the method advances from block 120 and includes the steps of extruding the biodegradable material with an extruder (not shown) into a plurality of pellets in block 130. The pellets are generally spherical in shape, but may have any suitable shape. In one embodiment, the pellets have a diameter of approximately 4.0 mm and a density of approximately 22 kgs/cuft. The pellets are then tumbled in a tumbler (not shown) and steamed and conveyed along a conveyor (not shown) for a constant flow. It should be appreciated that the pellets may be moistened by another suitable mechanism.

The method advances from block 130 and includes the steps of opening the mold in block 140 and filling the cavity of the mold with the pellets of the biodegradable material in block 150. The method advances from block 150 and includes the steps of pressing the pellets of the biodegradable material into the cavity in block 160. In one embodiment, a mechanical arm press (not shown) is used to compress the pellets in the mold. It should be appreciated that other types of mechanisms may be used to compress the pellets in the cavity of the mold.

The method advances from block 160 and includes the steps of closing the mold with the filled cavity and core in block 170 and forming the biodegradable mannequin 10 in block 170. The method advances from block 170 and includes the steps of curing the biodegradable material in the mold for a predetermined time period such as approximately twelve hours to approximately twenty-four hours by keeping the mold closed in block 180. Once the biodegradable material has cured and the biodegradable mannequin 10 is formed, the method advances from block 180 and further includes the steps of opening the mold in block 190 and removing the biodegradable mannequin 10 from the mold in block 200. From block 200, the method ends in bubble 210. It should be appreciated that the biodegradable mannequin 10 is integral, unitary, and one-piece. It should also be appreciated that the biodegradable mannequin 10 will degrade when exposed to moisture such as water and/or bacteria in a landfill. It should further be appreciated that biodegradable mannequin 10 may be made by various other methods, not specifically described herein.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making a biodegradable mannequin, said method comprising the steps of:
   providing a biodegradable material;
   extruding the biodegradable material into a plurality of pellets;
   filling a mold cavity of a mold with the extruded biodegradable material;
   pressing the extruded biodegradable material into the mold cavity;
   closing the mold;
   curing the extruded biodegradable material in the mold and forming the mannequin into a solid configuration;
   opening the mold; and
   removing the formed mannequin from the mold.

2. A method as set forth in claim 1 wherein the step of extruding comprises extruding the biodegradable material with an extruder into a plurality of pellets.

3. A method as set forth in claim 2 including the step of moistening the pellets.

4. A method of making a biodegradable mannequin, said method comprising the steps of:
   providing a biodegradable material;
   extruding the biodegradable material with an extruder into a plurality of pellets;
   moistening the pellets;
   filling a mold cavity of a mold with the extruded biodegradable material;
   pressing the extruded biodegradable material into the mold cavity;
   closing the mold;
   curing the extruded biodegradable material in the mold and forming the mannequin;
   opening the mold;
   removing the formed mannequin from the mold; and
   wherein the moistening comprises moistening with steam.

5. A method of making a biodegradable mannequin, said method comprising the steps of:
   providing a biodegradable material;
   extruding the biodegradable material into a plurality of pellets;
   filling a mold cavity of a mold with the extruded biodegradable material;
   pressing the extruded biodegradable material into the mold cavity by compressing the pellets in the mold with a mechanical arm press;
   closing the mold;
   curing the extruded biodegradable material in the mold and forming the mannequin;
   opening the mold; and
   removing the formed mannequin from the mold.

6. A method as set forth in claim 1 wherein the step of curing comprises curing the biodegradable material in the mold for a predetermined time period by keeping the mold closed.

7. A method as set forth in claim 6 wherein the predetermined time period is approximately twelve hours to approximately twenty-four hours.

8. A method of making a biodegradable mannequin, said method comprising the steps of:
   providing a biodegradable material;
   extruding the biodegradable material into a plurality of pellets;
   tumbling the pellets in a tumbler and conveying the pellets along a conveyor for a constant flow;
   filling a mold cavity of a mold with the extruded biodegradable material;
   pressing the extruded biodegradable material into the mold cavity;
   closing the mold;

curing the extruded biodegradable material in the mold and forming the mannequin;
opening the mold; and
removing the formed mannequin from the mold.

9. A method as set forth in claim 1 including the step of providing a mold which defines a cavity and core for the biodegradable mannequin.

10. A method as set forth in claim 1 wherein the biodegradable material is a starch based material.

\* \* \* \* \*